Z. ELLIS.
Rendering Apparatus.
No. 3,789.
Patented Oct. 12, 1844.
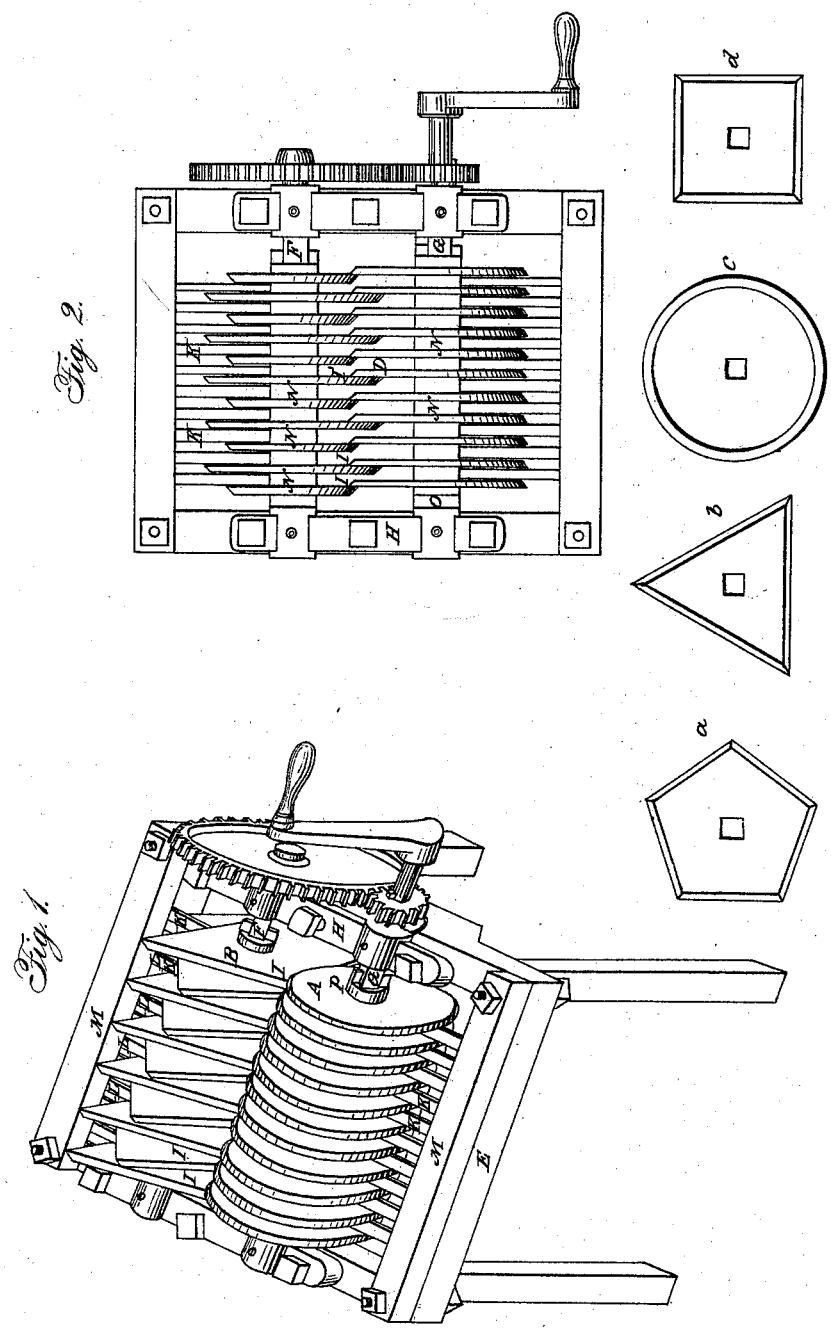

UNITED STATES PATENT OFFICE.

ZABINA ELLIS, OF KENSINGTON, PENNSYLVANIA.

MACHINE FOR CUTTING TALLOW, &c.

Specification of Letters Patent No. 3,789, dated October 12, 1844.

*To all whom it may concern:*

Be it known that I, ZABINA ELLIS, of the district of Kensington, in the county of Philadelphia and State of Pennsylvania, have invented a new and useful Machine for Cutting Tallow, Fat, or other Articles; and I do hereby declare that the following is a full, clear, and exact description of the construction and operation of the same, reference being had to the annexed drawings, making a part of this specification, in which—

Figure 1 is a perspective view of the whole machine. Fig. 2, is a plan showing the frame with the form and relative position of the component parts of the machine; and the sections $a$, $b$, $c$, $d$, the various forms of the blades that may be used in the machine.

The nature of my invention consists in the application of knives or blades operating in the manner of shears by a continuous rotary motion to the cutting of tallow, fat or other articles. The frame E is constructed of cast iron, or wood, in the usual way of framework. Upon two transverse shafts F and G revolving horizontally in brass boxes H, H, are fixed the blades A, B, C, D, &c. in such manner as to bring the cutting edges continually in contact with each other in the manner of shears, as shown at I: the tallow or material to be cut is introduced from a hopper or box above (omitted in the drawing for the sake of perspicuity) and passing through the knives is delivered at the bottom of the machine by means of the metal scrapers K, K, K, &c. which are placed nearly in contact with the knives, and are attached to the frame at L, and confined by means of a bar M secured down upon them as exhibited upon the plan. Motion is given to the blades by means of a wheel and pinion attached to their respective shafts, using for large machines where steam or other power is used a common pulley in place of the crank as shown in the drawings. The position of the blades, their number and distance apart are regulated by means of the metal rings N sliding upon the shaft and placed between the blades, the first being confined by a shoulder or projection upon the shaft as at O, and the last secured by the key or pin passing through at P.

What I claim as my invention and desire to secure by Letters Patent is—

The combination of the circular and angular knives as described and also in combination with the same the scrapers K K operating in the manner and for the purposes above set forth.

ZABINA ELLIS.

Witnesses:
JACOB PAINTER,
GEORGE STABZELL.